(12) United States Patent
Perlo et al.

(10) Patent No.: US 7,460,998 B2
(45) Date of Patent: Dec. 2, 2008

(54) VOICE CONNECTION SYSTEM BETWEEN HUMANS AND ANIMALS

(75) Inventors: Piero Perlo, Sommariva Bosco (IT); Valentina Grasso, Carignano (IT); Federica Valerio, Orbassano (IT)

(73) Assignee: S.I.SV.EL. Societa' Italiana per lo Sviluppo Dell'Elettronica S.P, (TO) (IT)

( * ) Notice: Subject to any disclaimer, the term of this patent is extended or adjusted under 35 U.S.C. 154(b) by 869 days.

(21) Appl. No.: 10/691,527

(22) Filed: Oct. 24, 2003

(65) Prior Publication Data

US 2004/0088164 A1    May 6, 2004

(30) Foreign Application Priority Data

Oct. 25, 2002    (IT)    ............................ TO2002A0933

(51) Int. Cl.
G10L 21/00    (2006.01)
A61B 5/00    (2006.01)
(52) U.S. Cl. ....................................... 704/270; 600/300
(58) Field of Classification Search ......... 704/270–275; 600/300; 119/721, 719, 174, 712; 340/573.1
See application file for complete search history.

(56) References Cited

U.S. PATENT DOCUMENTS

| | | | |
|---|---|---|---|
| 5,392,735 A * | 2/1995 | Xitco et al. ................. | 119/712 |
| 5,749,324 A * | 5/1998 | Moore ........................ | 119/719 |
| 5,790,033 A * | 8/1998 | Yamamoto ............... | 340/573.1 |
| 6,017,302 A * | 1/2000 | Loos ........................... | 600/28 |
| 6,178,923 B1 | 1/2001 | Plotkin | |
| 6,254,536 B1 * | 7/2001 | DeVito ....................... | 600/300 |
| 6,496,115 B2 * | 12/2002 | Arakawa .................. | 340/573.1 |
| 6,547,746 B1 * | 4/2003 | Marino ...................... | 600/554 |
| 6,556,868 B2 * | 4/2003 | Naritoku et al. ............... | 607/45 |
| 6,712,025 B2 * | 3/2004 | Peterson et al. ............. | 119/721 |
| 6,761,131 B2 * | 7/2004 | Suzuki ....................... | 119/174 |
| 7,282,028 B2 * | 10/2007 | Kim et al. .................... | 600/300 |
| 2002/0152970 A1 | 10/2002 | Takeda | |

FOREIGN PATENT DOCUMENTS

| | | |
|---|---|---|
| EP | 0730261 A2 | 9/1996 |
| GB | 2350263 A | 11/2000 |
| WO | WO 03/079775 A1 | 10/2003 |

OTHER PUBLICATIONS

Patent Abstracts of Japan vol. 1997, No. 07, Jul. 31, 1997 & JP 09 056290 A (Tomobe Yoko), Mar. 4, 1997, abstract.
Patent Abstracts of Japan vol. 1998, No. 13, Nov. 30, 1998 & JP 10 207592 A (Technos Japan:KK), Aug. 7, 1998, abstract.
European Search Report issued Mar. 11, 2004 in EP 03024238.2.

* cited by examiner

*Primary Examiner*—Vijay B Chawan
(74) *Attorney, Agent, or Firm*—Sughrue Mion, PLLC

(57) ABSTRACT

A voice connection system comprises a sensor matrix sending to a control unit signals indicating an animal's status in terms of stimuli, feelings, events, actions or behavior of said animal. The control unit selects—depending on the signals received—a voice message recorded into memory means associated to the unit, and activates a loudspeaker belonging to the system, in order to issue said voice message. The system further comprises voice recognition means, which activate pulse generators depending on the content of a voice message uttered by the human user.

10 Claims, 4 Drawing Sheets

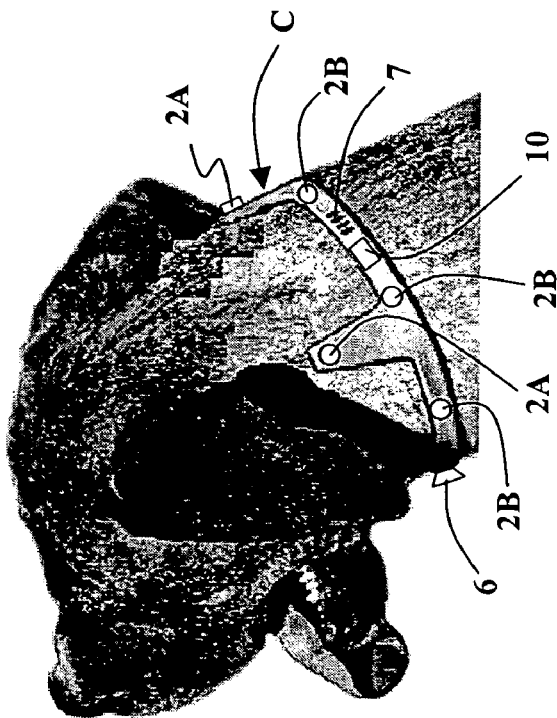
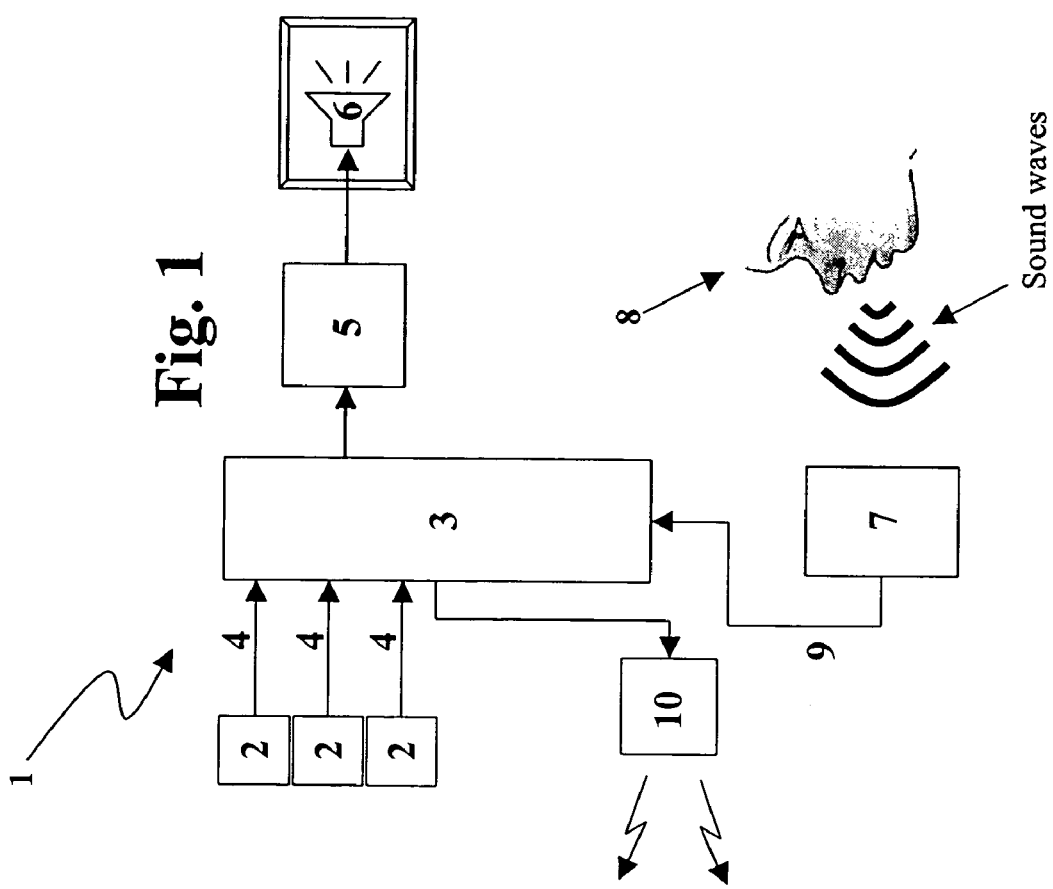
Fig. 1
Fig. 2

VOICE CONNECTION SYSTEM BETWEEN HUMANS AND ANIMALS

BACKGROUND OF THE INVENTION

The present invention relates to a voice connection system between humans and animals.

The Italian patent application no. TO2000A001154, filed by the Applicant, discloses a voice connection system between humans and domestic animals, comprising:

- a matrix of field sensors, placed on the head or integrated into the collar of the domestic animal, for converting into electric signals the field-pulses of alpha waves coming from the animal's head, the aforesaid electric signals being regarded as indicative of the animal's thought-desire,
- a microprocessor associated to the sensor matrix, comprising storage means into which human voice messages each corresponding to a different animal's thought-desire are recorded.

The microprocessor is designed to receive signals coming from the field sensors located on the animal's head and to activate a loudspeaker, so as to issue every time a voice message selected in the aforesaid storage means, on the basis of the aforesaid received signals.

The system according to the prior document mentioned also comprises speech recognition means for sending to the microprocessor signals representing the content of voice messages uttered by a person, and pulse-generating means associated to the animal's head, which receive from the microprocessor the aforesaid signals representing the content of voice messages and send corresponding pulses to the animal's brain.

SUMMARY OF THE INVENTION

The present invention aims at carrying out a particularly advantageous structure of a voice connection system between humans and animals of the type previously referred to.

Said aim is achieved according to the invention by means of a voice connection system between humans and animals having the characteristics as in the appended claims, which are intended as an integral and substantial part of the present description.

BRIEF DESCRIPTION OF THE DRAWINGS

Further aims, characteristics and advantages of the invention shall be evident from the following description, made with reference to the accompanying drawings, provided as a mere non-limiting examples, in which:

FIG. 1 is a block diagram showing in simplified form the structure of the system according to the invention;

FIG. 2 shows the head of a domestic animal, in this case a dog, wearing a collar integrating a system according to the invention;

DETAILED DESCRIPTION OF THE INVENTION

Figure 3:
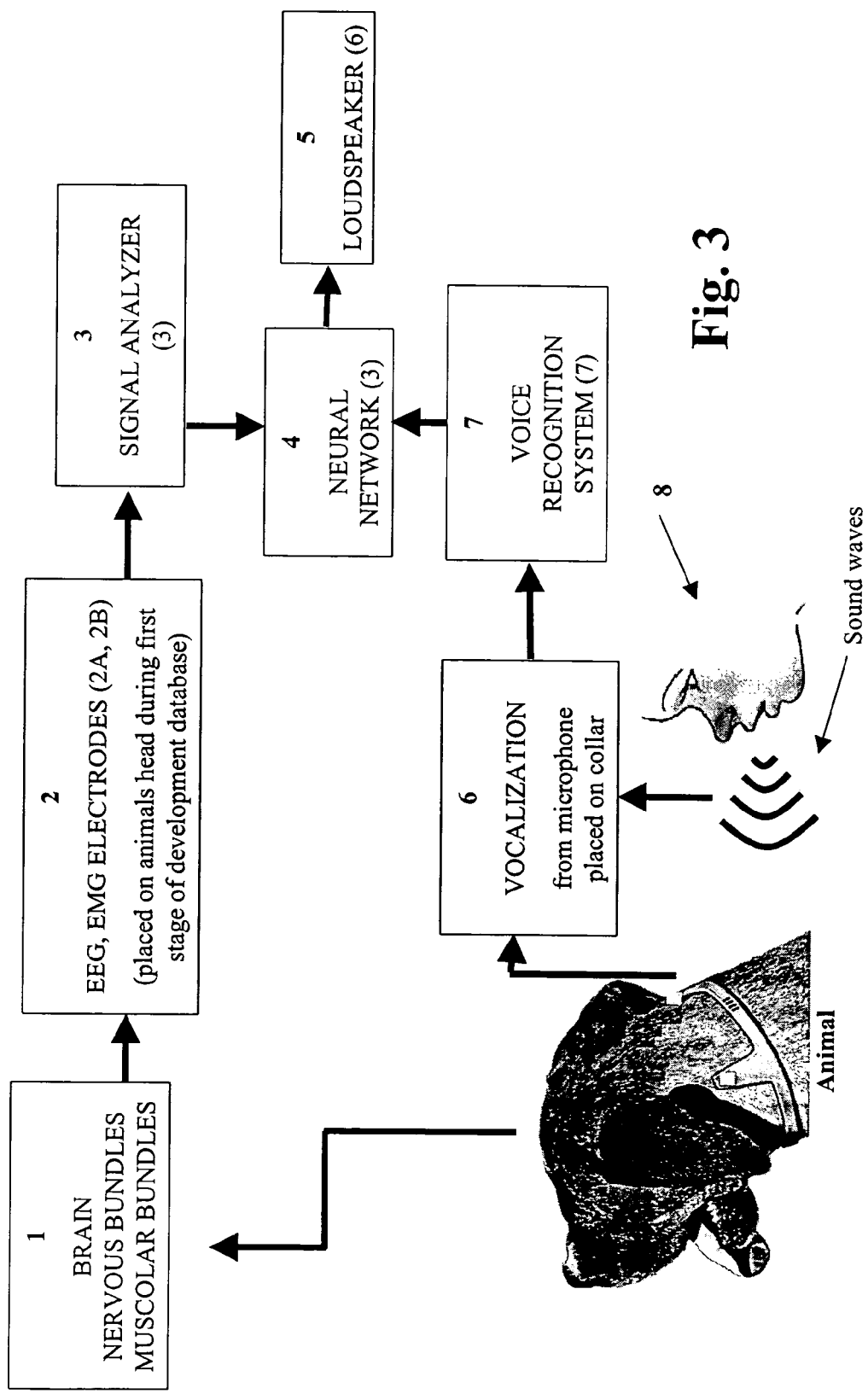
FIG. 3 shows in schematic form the principle of generation and emission of voice messages by the animal in the system according to the invention.

With reference to FIG. 1, number 1 globally indicates to a bi-directional Animal-Human communication system, carried out according to the teachings of present invention.

The system 1 comprises a series of sensors 2 for detecting and sending to a microprocessor-based unit 3 signals 4 representing various thoughts-desires of the dog. In the preferred embodiment of the invention, the system 1 is integrated into a collar, referred to with C in FIG. 2, which is carried out so that a first and a second sensor matrix, referred with 2A, are positioned directly below each ear of the dog, and other sensors referred to with 2B are arranged on the dog's neck.

Thus, the first and second sensor matrix 2A mentioned above lie close to the occipital-temporal region (back O1 and back O2: even number on right side of the skull and odd number on left side of the skull) and are particularly suitable for detecting cerebral waves; conversely, the sensors 2B are mainly intended for detecting signals coming from muscular and nervous bundles, in an annular area lying relatively close to the space where cerebral signals originate, i.e. the animal's neck (or anyhow its cervical-cephalic region), where the propagation of the nervous pulse and muscle contractions are relevant for the aim here proposed.

According to the invention, the detections made with the sensors 2A and 2B are electroencephalographic, or EEG, and electromyographic, EMG.

As is generally known, electroencephalography uses electrodes placed on the head of a patient for detecting and measuring models of brain electric activity, given by millions of neurons mainly located in the cerebral cortex. On the other hand, electromyography is a similar technique intended for the detection of electric activity related to muscular contraction and to the analysis of qualitative and quantitative variations of action potentials of the motory unit. EEG and EMG analyses can give useful, objective information on specific transitory stimuli-events-actions-behaviors of a patient under examination.

In said light it should then be pointed out that the sensors 2 are not therefore intended for detecting conventional cerebral waves only, in terms of spontaneous electric activity of the cerebral cortex, but for detecting a general spectrum of signals that are the consequence of specific transitory stimuli-events-actions-feelings-behaviors, included those shown by muscle motion.

Going back to FIG. 1, number 5 indicates storage means into which a first database is recorded, wherein a plurality of different human voice messages corresponding to the various possible signals 4 received by the unit 3 are encoded, representing the animal's stimuli-events-actions-feelings-behaviors. To said purpose the unit 3 comprises a suitable analyzer, which selects within the storage means 5 the message corresponding to the signal 4 received and activates a miniaturized loudspeaker 6, in order to issue an output voice message corresponding to the animal's thought-desire. Said operating mode of the system according to the invention is schematically shown by blocks 1-5 of FIG. 3.

The system 1 further comprises speech recognition means 7, which receive a voice message uttered by a person 8 and issue output signals 9 received by the unit 3. According to an important feature of the invention the unit 3, depending on the type of signal 9 received, activates a generator of radioelectric waves 10; the signals issued by the generator 10, corresponding to the voice message uttered by the user 7, are sent directly to the animal's brain. The technique used for sending signals from the generator 10 directly to the animal's brain, without any artificial guide, can be of any known type (radiofrequency, microwaves, ultrasounds, voice-FM). For instance, in a possible embodiment the generator 10 works with radio frequency, so as to modulate a steady-state frequency at about 15 KHz with signals varying from 300 Hz to 4 KHz; the output result is an approximately steady-state tone incorporating a non-audible signal, which however can be perceived directly by the animal's brain. Techniques like the one mentioned above are used for instance for inserting subliminal messages into audio communications or in the field of radio-hypnosis.

Figure 4:
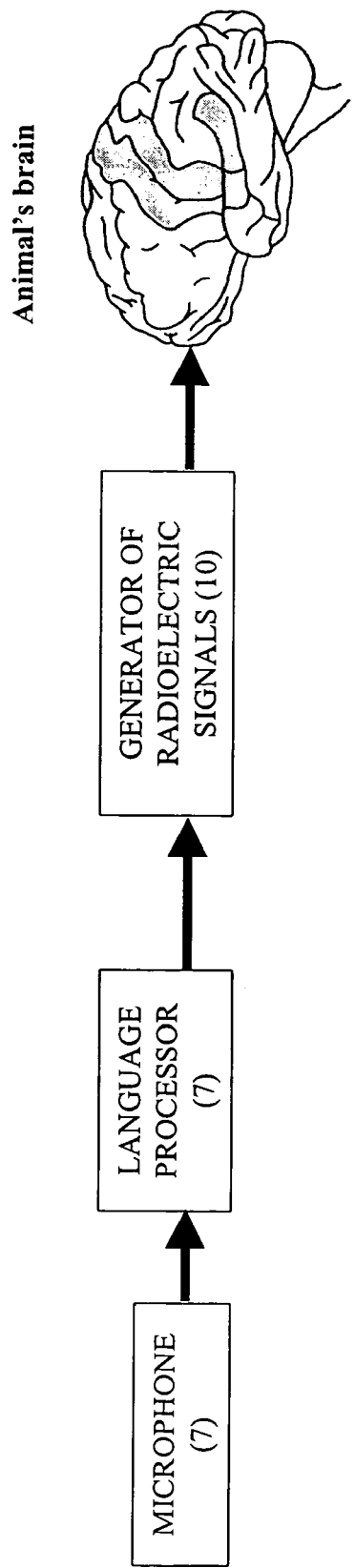
FIG. 4 shows in schematic form the principle of reception and interpretation of voice messages by the animal in the system according to the invention.

In other words, therefore, depending on a signal 9 representing a voice message of the person 8 received and decoded by the means 7, the unit 3 controls the generator 10 so that the latter issues a suitable radioelectric signal that directly reaches the animal's cerebral area, in order to stimulate the execution of given actions or to have given feelings. Said operating mode of the system according to the invention is schematically shown in FIG. 4.

The speech recognition means 7, comprising an electronic circuit integrated into a microphone or a microphone matrix, convert in per se known ways a PCM (pulse Code Modulation) digital audio signal into a corresponding graph of frequency component amplitudes. The speech recognition means 8 are also associated to a second database (for instance encoded into a convenient area of the storage means 5) containing several thousands of sample graphs, which identify different types of sounds the human voice can produce; indeed, therefore, the input sound getting into the system is identified by relating it to the type of pre-stored sound which is closer to the one under examination.

In practice, therefore, when the microphone mentioned above detects sound waves, these are processed by the speech recognition means 7, which select and encode useful sounds; the corresponding codes are sent to the generator 10, which converts said codes into radioelectric signals directly stimulating the animal's cerebral fibers. The animal thus hears almost simultaneously the human voice and the radiofrequency signal, thus associating the two stimuli (as in a sort of Pavlov's conditioning) and getting to understand human language.

Said part of the operation of the system according to the invention is schematically shown by blocks 1-5 of FIG. 3.

According to an important feature of the invention, in order to help the system to adapt to the user's 8 voice and to his/her speaking style, the unit 3 integrates a neural network structure. As is known, neural networks are mathematical systems developed in the course of researches on artificial intelligence, said systems being characterized by a high level of adaptability, meant as the ability to learn and store information, as well as use it whenever necessary, and meant above all as the ability to approximate an unknown function between input and output.

Also in the case of the present invention it is provided for a system "teaching" period, in order to achieve a correct configuration of the neural network, which is necessary for an accurate operation of the speech recognition system. Said teaching period is also necessary for correctly relating the signals 4 to the corresponding stimuli-events-actions-feelings-behaviors of the animal, in order to issue an audio message by means of the loudspeaker 6, and for correctly linking the radioelectric waves produced by the generator 10 to the corresponding voice message uttered by the person 8.

With reference to the first aspect, the system shall be taught to record the signals 4 of the animal "at work". An example of said activity can consist in finding a relation between an indication made by the person 8, here acting as supervisor or instructor, to a series of selected substances and the corresponding signals 4 recorded by unit 3, which reflect the global reactions of the animal in terms of effects-behaviors-feelings towards a given smell-substance.

With reference to the second aspect, a series of basic words or sentences are recorded into the storage means 5 of unit 3 through the speech recognition means 7. The vocalization of these words/sentences is associated to specific actions which the dog has to perform and their utterance is controlled by the person 8, who here again acts as supervisor or instructor, through the neural network implemented into the system control logic. The algorithms of the neural network shall determine the best relation between the voice input provided by the person 8 and the output of the generator 10.

Note that during a first stage, matrixes of electrodes 2 and microphones shall be placed on the animal's head, so as to achieve a better processing of the signals used for setting the system 1; then they shall be located in the collar C, so as to convert both the pulses detected on the animal's body into electric signals indicating a status of the animal due to stimuli, feeling, events, actions, behaviors, and the vocalization of the same animal or of another animal being, such as man.

Thanks to the characteristics mentioned above, the unit 1 according to the invention can simulate an exchange of human voice messages between the user and the animal, in which the voice messages "provoked" by the animal are the result of a language generated iteratively on the basis of pre-recorded messages selected by unit 3 so as to actually correspond to the animal's feelings-behaviors-thoughts-desires.

According to an important feature of the invention, the presence of the neural network control system and of the speech recognition system 7 enables unit 3 to perform a self-learning logic, in which the animal develops little by little its own language with an evolutive process, through the interactive loop brain-sensors 2-loudspeaker 6-microphone-generator 10-brain, i.e. by listening through the means 7 and the loudspeaker 6 to the vocalizations it issues in association to the reactions to the environment; the instructor 8 can correct or acknowledge with his/her own voice messages the correctness of the voice messages issued by the loudspeaker 6 on the basis of the signals 4 (as shown by blocks 6-7 of FIG. 3, together with blocks 4-5). On the other hand, as was already said, the computer-assisted processing of the audio signal received by the speech recognition system or language processor 7, converted into radioelectric waves having different frequencies and amplitudes, can directly reach the animal's brain, as shown in FIG. 4. It is thus possible to make available to the cerebral cortex the fundamental information characterizing the acoustic structures of spoken language (frequency, intensity, tone, intonation), and so the brain can send signals to the vocal cords uttering in their turn sounds/vocalizations. Through a self-forming process, made possible by the peculiar plastic character of the brain, the animal spontaneously learns to control its own voice. Indeed, the dog's brain controls the micro-loudspeaker 6 and learns how to make uttered sounds similar to those received from the instructor 8; the latter directly intervenes in the loop on the communication system when the animal's brain alone is not sufficient for a correct learning process.

Figure 5:
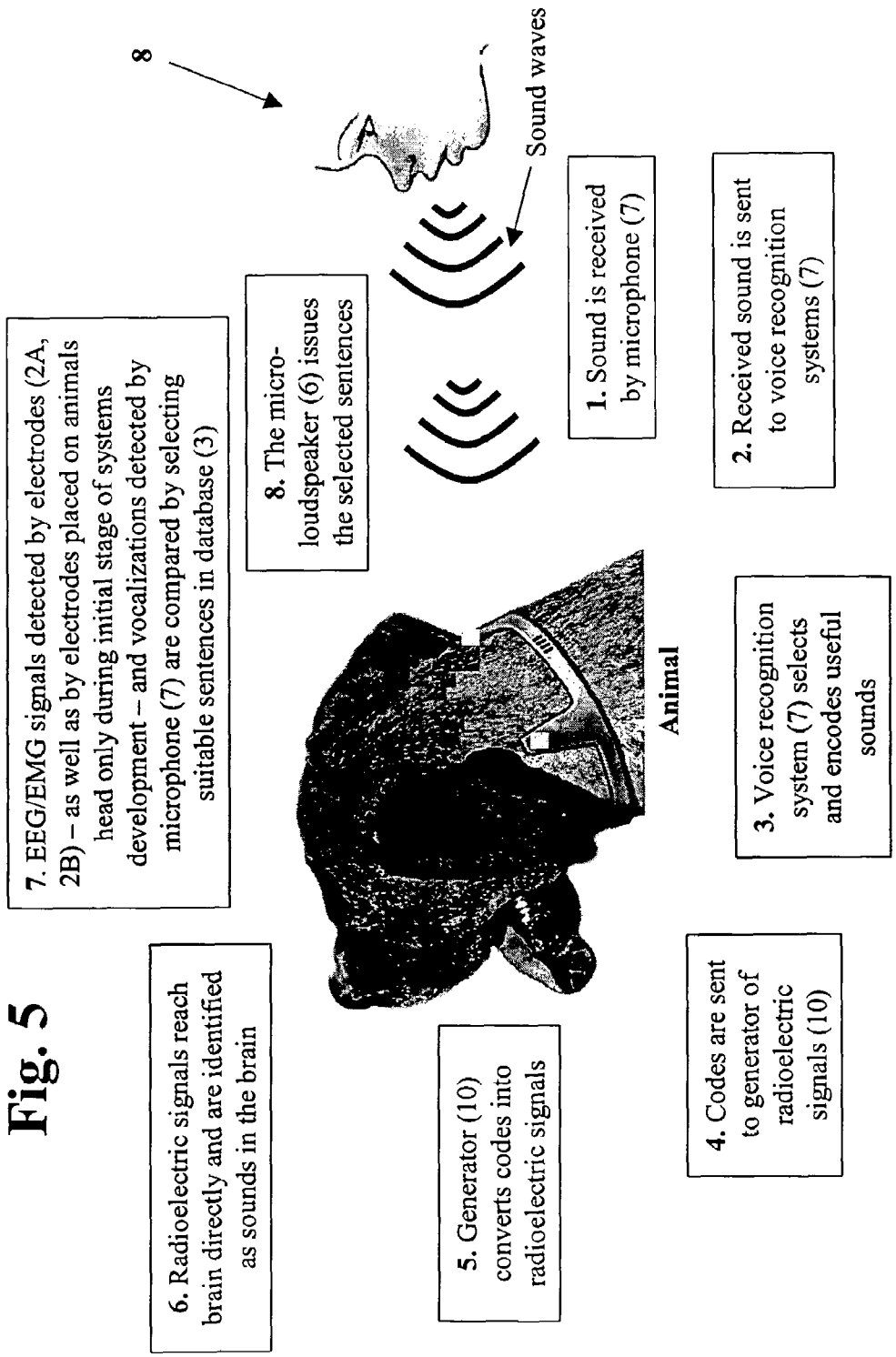
FIG. 5 shows in schematic form the general operating principle of the system according to the invention.

From the description made above it is evident that the system 1 carries out an actual human-animal adaptation interface system, which can support a bi-directional communication controlled by the neural network logic unit implemented into the microprocessor-based unit 3, where the input for human-animal communication comprises vocal instructions from the person 8, detected through the recognition means 7, and its output comprises signals that can be perceived by the animal's brain, produced by the generator 10, as schematically shown by blocks 1-6 of FIG. 5;

the input for animal-human communication comprises data detected through the sensors 2, and its output comprises the indication of the "status" the animal is in at that moment, issued through the loudspeaker 6, as schematically shown by blocks 7 and 8 of FIG. 5.

All components referred to above for the system according to the invention, as well as the necessary electric supply means, can be carried out with modern technologies in miniaturized size and can therefore be easily positioned on the animal's body, preferably in one collar C.

Obviously, though the basic idea of the invention remains the same, construction details and embodiments can widely vary with respect to what has been described and shown by mere way of example, however without leaving the framework of the present invention.

What is claimed is:

1. Voice connection system between humans and animals, comprising:

sensor means designed to be positioned on an animal for converting pulses detected on the animal's body into first electric signals indicating a status of said animal, processing means operatively associated with the sensor means, comprising memory means into which human voice messages corresponding to different statuses of the animal are recorded, loudspeaker means operatively connected to the processing means, the processing means receiving first electric signals coming from said sensor means and activating said loudspeaker means in order to issue a voice message selected in said memory means, in function of the aforesaid first electric signals received, speech recognition means for sending to the processing means second electric signals representing the content of voice messages uttered by a human user, and pulse-generating means, which receive from said processing means said second electric signals representing the content of the voice messages uttered by the human user, and which send to the animal's brain corresponding pulses, wherein said processing means includes a neural network control system, said sensor means comprises first and second electroencephalographic sensors and an electromyographic sensor, at least the first and second electroencephalographic sensors are placed close to respective ears of the animal, or close to its occipital-temporal region, and the electromyographic sensor is placed on the animal's neck, and wherein said pulse-generating means is constituted by a generator (10) of radioelectric waves, that converts said second electric signals into radioelectric waves having different frequencies and amplitudes, which are sent directly to the animal's brain.

2. System according to claim 1, wherein said generator (10) works with radiofrequency, so as to modulate a steadstate frequency at about 15 KHz with signals varying from 300 Hz to 4 KHz.

3. System according to claim 1, wherein said neural network control system is programmed for enabling a human/animal interactive self-learning procedure, where in particular the human user can correct or acknowledge with his/her voice messages the correctness of the voice messages issued by said loudspeaker means, and/or the animal can hear the human voice and the corresponding radioelectric waves simultaneously, thus associating the two stimuli.

4. System according to claim 1, wherein said sensor means, said processing means, said loudspeaker means, said speech recognition means and said pulse-generating means are integrated into a collar.

5. System according to claim 1, wherein said speech recognition means are used as means integrated and/or complementary to said sensor means, in order to improve the interpretation of the animal's status as detected through said sensor means.

6. System according to claim 1, wherein said system develops in time, through an evolutional process, a language which is the animal's own language, because the animal perceives—both with its own ears and through the stimuli produced by said pulse-generating means—its own vocalization and the voice output of said loudspeaker means.

7. System according to claim 1, wherein said electric signals indicating a status of the animal are the result of stimuli, feelings, events, actions, or behaviors, including those shown by the motion of the animal's muscles.

8. Method for allowing vocal connection between a human and an animal, comprising the following steps:

i) detecting on the body of the animal electric pulses in the animal's brain, muscles and/or nerves, which are indicative of a status of an animal in terms of stimuli, feelings, events, actions, or behaviours, including those shown by the motion of the animal's muscles;

ii) converting the detected pulses into first electric signals which are sent to processing means;

iii) selecting by the processing means a stored human-type vocal message corresponding to received first electric signals and activate as a consequence a loudspeaker for emitting a selected human-type vocal message, thus simulating the possibility of speaking for the animal;

iv) receiving human-type vocal messages in a speech recognition means and sending respective second electric signals to the processing means; and v) generating, by the processing means, stimuli for inducing the animal to take determined actions or perceive determined feelings as a function of the type of the received second electric signals, wherein, for the purpose of performing step v), the received second electric signals are converted into radioelectric waves having different frequencies and amplitudes, which are sent directly to the animal's brain.

9. The method according to claim 8, wherein the animal is brought to develop its own language in time with an evolutive process, through an interactive loop comprising steps i) to v), including the hearing by the animal of the vocalizations it generates, as per steps i) to iii), in association with its reactions to the environment.

10. The method according to claim 8, wherein said second electric signals are converted by a generator (10) that works with radio frequency and modulates a steady-state frequency at about 15 KHz with signals varying from 300 Hz to 4 KHz.

* * * * *